United States Patent [19]

Glättli

[11] 4,432,004

[45] Feb. 14, 1984

[54] DEVICE FOR CAPPING THE JET NOZZLES OF AN INK JET PRINTING HEAD

[75] Inventor: Alfred Glättli, Hamburg, Fed. Rep. of Germany

[73] Assignee: U.S. Philips Corporation, New York, N.Y.

[21] Appl. No.: 313,865

[22] Filed: Oct. 22, 1981

[30] Foreign Application Priority Data

Nov. 3, 1980 [DE] Fed. Rep. of Germany ....... 3041187

[51] Int. Cl.³ ............................................ G01D 15/18

[52] U.S. Cl. .................................. 346/140 R; 346/75

[58] Field of Search .......................... 346/75, 140 PD

[56] References Cited

U.S. PATENT DOCUMENTS

| | | | |
|---|---|---|---|
| 3,839,721 | 10/1974 | Chen et al. | 346/75 |
| 4,223,324 | 9/1980 | Yamamori et al. | 346/140 PD |
| 4,228,442 | 10/1980 | Krull | 346/140 PD |
| 4,296,418 | 10/1981 | Yamazaki et al. | 346/140 PD X |
| 4,364,065 | 12/1982 | Yamamori et al. | 346/140 PD |

*Primary Examiner*—George H. Miller, Jr.
*Attorney, Agent, or Firm*—Robert S. Smith

[57] ABSTRACT

A capping device consists of a container is filled with a wetting medium and whose side which faces the jet nozzles is covered by a semi-permeable diaphragm. The diaphragm may be stretched across the holder in a tight or in loose manner. The diaphragm is permeable for the wetting medium and preferably consists of a cellulose hydrate with a thickness of approximately 22 μm.

7 Claims, 2 Drawing Figures

DEVICE FOR CAPPING THE JET NOZZLES OF AN INK JET PRINTING HEAD

BACKGROUND OF THE INVENTION

1. Field of the Invention

The invention relates to a device for capping jet nozzles of an ink jet printing head by means of a deformable material.

2. Description of the Prior Art

A device of this kind is known from German Auslegeschrift No. 27 02 663. The printing head with its jet nozzles is movable on guide rails along a record carrier for the printing operation. The length of the guide rails exceeds the printing width, so that the printing head is in the rest position at the beginning or at the end of the printing zone during intervals between printing. In order to prevent drying out of the jet nozzles in the rest position, the jet nozzle plates of the printing head are covered by means of a cushion of a substance having viscous elastic properties. Because the printing head is normally linearly moved, the capping device is pivotably mounted on the housing of the ink jet printer outside the printing zone. As soon as the printing head is in the rest position, the capping device is moved in the direction of the jet nozzles, so that the nozzles are capped.

This known capping device offers the advantage that the quick-drying ink penetrates from the jet nozzles into the cavities of the viscous material, thus offering tight sealing of the jet nozzles. Even though the surface deformation of such a substance is normally reversible, a more or less permanent deformation occurs in the case of prolonged use. Therefore, such covering of the jet nozzles is not suitable for long-term use, notably because after the pivoting of the capping device away from the jet nozzles, the ink present on the viscous elastic cushion also dries very quickly and causes a stress on the surface of the cushion which counteracts reversible deformation. This effect can be reduced by pressing the capping device against the jet nozzle with a comparatively high pressure; it is then necessary to increase the pressure as the capping device is used longer. On the other hand, the viscous elastic cushion must be regularly replaced.

SUMMARY OF THE INVENTION

It is the object of the invention to provide a capping device for the jet nozzles of an ink jet printing head in which contamination of the jet nozzles and the capping material by drying ink or drying wetting medium and penetration of the wetting medium into the jet nozzle duct are prevented. Moreover, the device must have a comparatively simple mechanical construction.

To this end, the device in accordance with the invention is characterized in that there is provided a container which is filled with a wetting medium and whose side which faces the jet nozzles is covered, at least at the area of the jet nozzles by a semipermeable diaphragm, which can be arranged against the mouths of the jet nozzles. The wetting medium may be mixable with the ink in the jet nozzles or be soluble therein or be insoluble therein. Preferably, for the wetting medium use is made of a liquid which does not readily evaporate, for example, polyethylene glycol, ethylene glycol, diethylene glycol or glycerine.

The container with the wetting medium can be filled by repeated replenishment or by continuous supply from a storage container. The diaphragm is preferably loosely stretched across the side of the container facing the jet nozzles, the wetting medium present in the container being pressed against the diaphragm under pressure, so that the diaphragm settles against the surface of the jet nozzles of the printing head. Preferably, a cellulose hydrate is used as the material for the diaphragm.

BRIEF DESCRIPTION OF THE DRAWINGS

The invention will be described in detail hereinafter with reference to two embodiments.

DESCRIPTION OF THE PREFERRED EMBODIMENT

Figure 1:
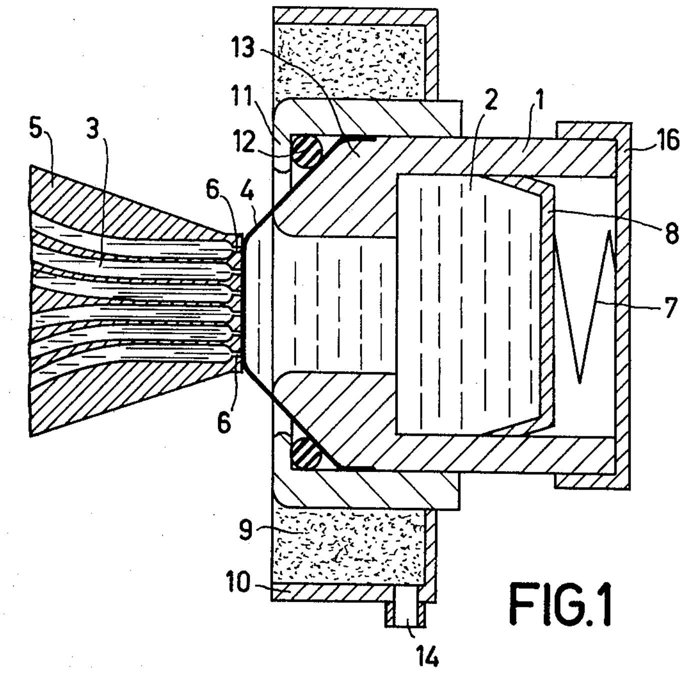
FIG. 1 shows a device in accordance with the invention in which the diaphragm is loosely stretched across the side of the container which faces the jet nozzles of the printing head.

It is important that the ink emerging from the jet nozzles of ink jet printers dries as soon as the ink reaches the record carrier. Penetration of the ink into the material of the record carrier is thus prevented. Penetration into the record carrier would lead to a poor printing quality. The short drying time contradicts a desirable longer drying time in the jet nozzles. The longer-drying time is desirable to prevent clogging of the jet nozzles in the case of prolonged periods without printing activities. However, because a high printing quality is more important, use is made of devices which cap the jet nozzles during periods during which no printing takes place in order to protect the nozzles against drying out.

The device for capping the jet nozzles of an ink jet printing head in accordance with the invention consists of a container 1 which has a cylindrical shape in the described embodiments. On its side which faces the printing head 5, the container 1 comprises a conical end portion 13 which is open at least at the area of the jet nozzles 6. The opposite side of the container 1 is closed by means of a removable bottom 16.

The open side of the container 1 is closed by a semipermeable diaphragm 4 which is stretched between the conical end portion 13 and the inner side of a coupling nut 11. This is realized by screwing the nut 11 onto the container 1 with an intermediate sealing ring 12 after the diaphragm has been fitted across the cone 13. The diaphragm is made of a material which is permeable for the wetting medium. For the ink, however, the diaphragm may be or may not be permeable, as desired.

In the embodiment shown in FIG. 1, the diaphragm 4 is loosely arranged across the cone 13. Moreover, in the container 1 there is provided a piston 8 which is pressed in the direction of the open side of the container 1 by a spring 7. The wetting medium 2 in the container 1 is thus pressed against the diaphragm 4 which is thus pressed outwards to settle against the mouths of the jet nozzles 6. The wetting medium 2 is introduced by removal of the bottom 16 and the piston 8 and by refitting these parts after the introduction of the wetting medium. Contrary to the present embodiment, instead of the spring 7 use can be made of a device which enables the piston 8 to be moved forwards and backwards as desired. This offers the advantage that in the retracted position of the piston 8, the diaphragm 4 is no longer pressed outwards, so that the nozzles 6 are disengaged.

A device of this kind can be used when use is made of a stationary container 1 instead of a pivotable container. If it is necessary to pivot the printing head 5 for the printing action, the piston 8 can then be retracted. At the instant at which the printing head 5 is in the rest position again, the piston 8 is then moved forward again, so that the diaphragm 4 settles against the jet nozzles 6 again.

A further advantage of the loosely stretched diaphragm consists in that printing heads comprising ends which are not flat can thus also be capped, for example, printing heads comprising curved jet nozzle plates, ring nozzles, conical nozzles, etc.

Figure 2:
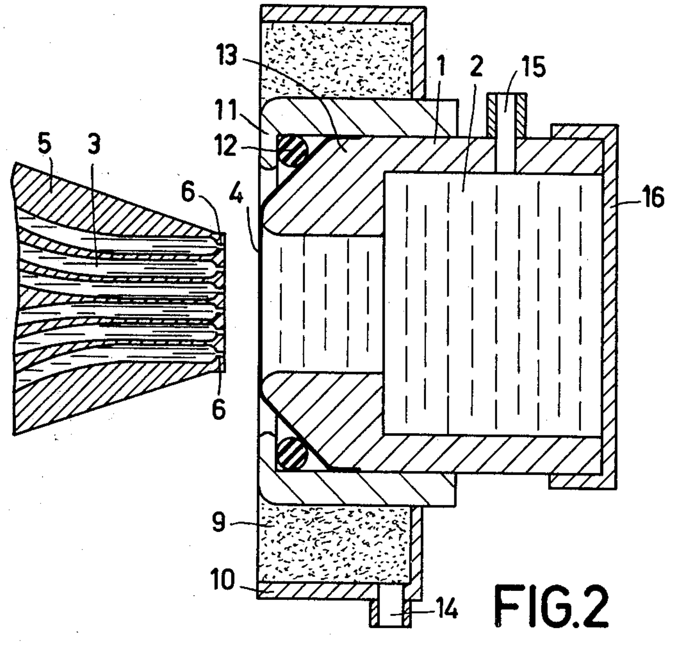
FIG. 2 shows an elaboration of the device shown in FIG. 1 in which the diaphragm is tensioned across the relevant side of the container.

In the embodiment shown in FIG. 2, the diaphragm 4 is tensioned tightly across the cone 13. In this case it is necessary to pivot the container 1 against the jet nozzles 6 in order to cap the mouths of the jet nozzles 6. In order to avoid the necessity of regular replenishment of the wetting medium 2, there is provided a tube 15 which connects the container 1 to a storage container (not shown) for the wetting medium 2. Obviously, a tube 15 of this kind can also be used in the embodiment shown in FIG. 1. However, because the container 1 thereof contains pressurized wetting medium 2, it is necessary to provide a valve which prevents the return of the wetting medium to the storage container.

The container 1 is enclosed by an additional container 10 which contains an absorbing material 9. The additional container 10 comprises an outlet aperture 14. The additional container serves to collect ink 3 and contaminations deposited on the diaphragm 4 and to discharge these substances via the outlet aperture 14. Ink which is ejected in order to clean the jet nozzles and which reaches the diaphragm and wetting medium 2 which emerges through the diaphragm 4 also flow to the container 10.

The wetting agent 2 may be soluble in the ink 3, be mixable therewith or also be insoluble therein. It may be volatile or non-volatile. However, use is preferably made of a wetting medium which is non-volatile and which can be mixed with the ink. When a pressurized wetting medium 2 is used, the permeability of the diaphragm and the force exerted by the piston 8 must be adapted so that only small quantities of wetting medium pass through the diaphragm, because otherwise the supply of wetting medium will be quickly exhausted. Therefore, it is attractive to use a device in which the wetting medium is supplied from a storage container.

It is alternatively possible to construct the entire capping device as a cartridge which is replaced by a fresh, full cartridge after the wetting medium has been used up. The fixing device for the capping device should then be constructed accordingly. It could be, for example, a clamping device for the cartridge.

The described device for capping the jet nozzles of an ink jet printing head offers the advantage that the wetting medium is not contaminated by the ink and that the position of the jet nozzles at the area of capping may be arbitrary.

Experiments with the described capping device have offered excellent results. The jet nozzles 6 were used with an ink 3 consisting of dye, wetting medium and approximately 90% water. The container was filled with diethylene glycol as the wetting medium and the diaphragm consisted of a cellulose hydrate having a thickness of 22 $\mu$m. Immediately after completion of the printing operation, the diaphragm was brought into contact with the jet nozzles. After eighteen days, the container 1 was removed. The jet nozzles 6 started immediately and produced correct and jet black prints after approximately 300 pulses. After operation for approximately 30 minutes, the jet nozzles were switched off and left uncovered. After 15 minutes, the jet nozzles were completely dry and could no longer be used. The diaphragm 4 which is always slightly wet on the outside thus prevents the drying of the jet nozzles for many days.

What is claimed is:

1. A device for capping jet nozzles of an ink jet printing head by means of deformable material, comprising:

a container which is filled with a wetting medium;

a semipermeable diaphragm covering the side of said container which faces the jet nozzles, at least at the area of said jet nozzles;

said semipermeable diaphragm being arranged against the mouths of said jet nozzles;

said diaphragm being permeable for the wetting medium; and a piston arranged inside said container on which a force is exerted in the direction of the diaphragm.

2. A device as claimed in claim 1, characterized in that the wetting medium (2) is a non-volatile liquid.

3. A device as claimed in claims 1 or 2, characterized in that the diaphragm (4) consists of a cellulose hydrate.

4. A device as claimed in claims 1 or 2, characterized in that the container (1) has a cylindrical shape, the diaphragm (4) being stretched between a conical end portion (13) of the container (1) and the inner side of a coupling nut (11) which can be screwed thereon.

5. A device as claimed in claims 1 or 2, characterized in that the container (1) is connected to a storage container for the wetting medium (2).

6. A device as claimed in claim 1, characterized in that the diaphragm (4) is loosely stretched across the side of the container (1) which faces the jet nozzles (6) and settles against the jet nozzles (6) under the influence of the force exerted by the piston (8).

7. A device as claimed in claim 6, characterized in that the force exerted on the piston (8) is produced by a spring (7) between the piston (8) and the bottom (16) of the container (1).

* * * * *